United States Patent [19]

Carlson

[11] 3,833,859

[45] Sept. 3, 1974

[54] TEMPERATURE CONTROL SYSTEM AND THERMOSTAT THEREFOR

[75] Inventor: Elmer A. Carlson, Agoura, Calif.

[73] Assignee: International Telephone and Telegraph Corporation, New York, N.Y.

[22] Filed: Mar. 23, 1973

[21] Appl. No.: 344,070

[52] U.S. Cl. ...................... 330/69, 236/78, 307/310, 328/3, 330/112

[51] Int. Cl. .............................................. H03f 1/40

[58] Field of Search ............ 330/30 D, 69, 72, 112, 330/146; 307/310; 328/3

[56] References Cited

UNITED STATES PATENTS 3,535,561 10/1970 Pinckaers............................ 307/310

*Primary Examiner*—Herman Karl Saalbach
*Assistant Examiner*—James B. Mullins
*Attorney, Agent, or Firm*—A. Donald Stolzy

[57] ABSTRACT

A two wire thermostat utilizing at least four resistors and a differential amplifier. The amplifier output is connected to one lead of the two wire line. One of the resistors is variable. Another is a thermistor. A first auxiliary resistor which may be employed in one power lead of the amplifier performs two functions. It provides positive feedback for a more stable regenerative snap on and off. It also makes the amplifier gain more nearly constant over an applied voltage swing of from about zero to 12 or zero to 24 volts. The applied voltage may be obtained from any source of D.C. or A.C. potential. If the source is A.C., the voltage may be a half wave or full wave rectified sine wave. A second auxiliary resistor may be employed in the other power lead of the amplifier to provide additional positive feedback to the inverting input of the amplifier. This provides a cleaner opening of the circuit when the voltage across the thermostat is low. A diode in one lead of the two wire line can perform three functions. It can provide rectification. It can also provide reverse voltage protection. Further, it can provide heat anticipation. A capacitor connected between the amplifier inputs provides some memory during off periods of a half wave A.C. cycle.

3 Claims, 2 Drawing Figures

PATENTED SEP 3 1974 3,833,859

TEMPERATURE CONTROL SYSTEM AND THERMOSTAT THEREFOR

BACKGROUND OF THE INVENTION

This invention relates to heating and/or cooling systems, and more particularly, to a temperature control system and a thermostat therefor. If desired, the thermostat may or may not be operated in a recreational vehicle off of a two-wire line.

In the past, prior art thermostats have been complicated and expensive. They have also required a substantially constant voltage or a filtered power supply. They have been either A.C. or D.C., but not both. Stable snap action has also been difficult to obtain. Such prior art thermostats also employ an amplifier connection such that the gain thereof is variable with the amplitude of the applied voltage. Prior art thermostats also do not provide a clean circuit opening when the applied voltage is low.

SUMMARY OF THE INVENTION

In accordance with the present invention, the above-described and other disadvantages of the prior art are overcome by providing a circuit having two main leads, and a differential amplifier having an output connected to one of the main leads. The thermostat of the present invention is thus uncomplicated and inexpensive.

The thermostat of the present invention does not require a filtered power supply or constant voltage because a first auxiliary resistor is employed in one power lead of the amplifier. Moreover, either a D.C. or A.C. source of potential may be employed. The applied voltage may also vary over a large range. For example, the applied voltage may vary from zero to 12 volts RMS or from zero 36 volts RMS.

The first auxiliary resistor also provides for stable snap action. It also makes the amplifier gain substantially constant and independent of the magnitude of the applied voltage.

In accordance with the present invention, a second auxiliary resistor in the other power lead of the amplifier provides for a clean circuit opening when the applied voltage is low.

Memory from one-half cycle to the next is provided by a capacitor connected between the amplifier inputs.

Another outstanding advantage of the present invention resides in the use of a diode which can perform three functions. These are (1) rectification, (2) reverse voltage protection, and (3) heat anticipation.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENT

Figure 1:
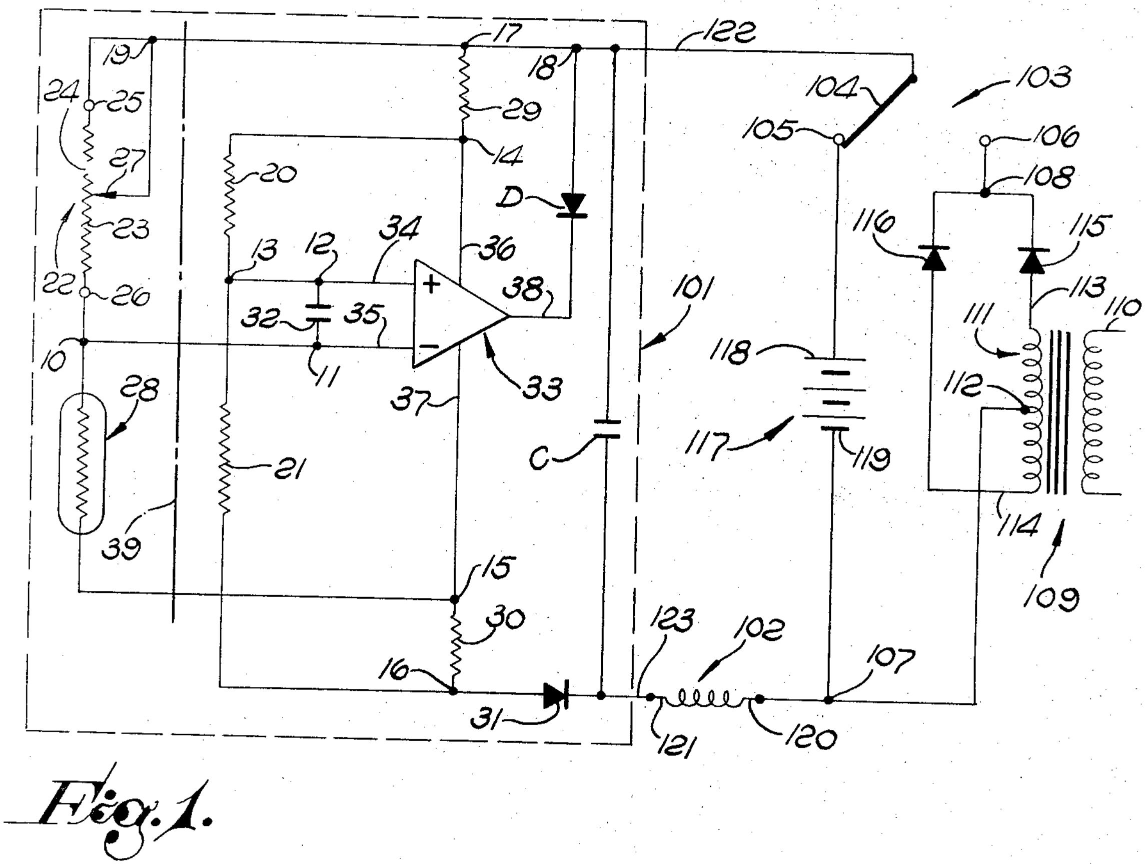
FIG. 1 is a schematic diagram of one embodiment of the present invention.
Figure 2:
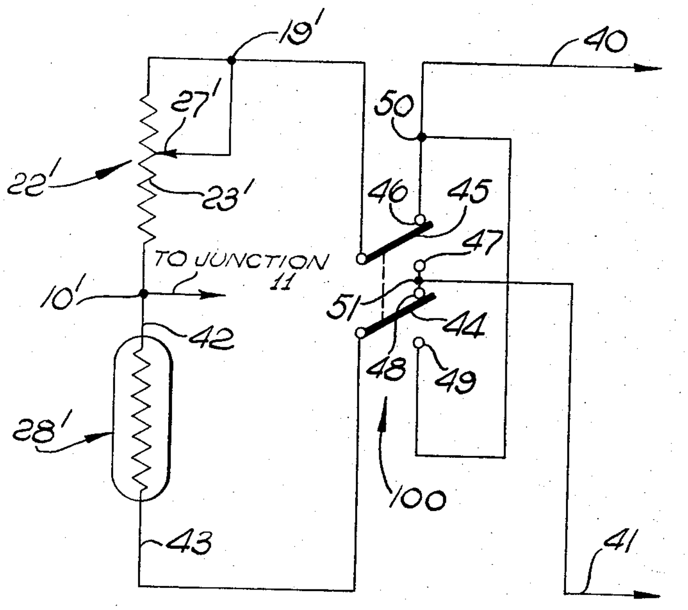
FIG. 2 is a schematic diagram of an alternative embodiment of the present invention.

In the drawings, in FIG. 2, a double-pole, double-throw switch 100 is shown. When this is in one position, a thermostat 101, shown in FIG. 1, may be employed to operate heating apparatus. When the switch 100 is in the other position thereof, the thermostat 101 may be employed to operate cooling apparatus.

As shown in FIG. 1, a winding 102 may be the winding of a gas solenoid valve connected to supply natural gas to a gas furnace. If desired, winding 102 with a cooling relay winding may be alternately switched into and out of the circuit of FIG. 1 by a switch ganged, if desired, with switch 100.

For clarity, the embodiment of FIG. 1 has been selected to illustrate a construction for heating a space to a selected temperature.

As shown in FIG. 1, a single-pole, double-throw switch 103 is provided having a pole 104, a contact 105 and a contact 106. Junctions are provided at 107 and 108.

Junctions 107 and 108 are connected together. A transformer is provided at 109 having a primary winding 110 and a secondary winding 111. Secondary winding 111 has a center tap 112 which is connected to junction 107. Winding 111 has leads 113 and 114. A diode 115 is connected from lead 113 to junction 108. A diode 116 is connected from lead 114 to junction 108. Both diodes 115 and 116 are poled to be conductive in a direction toward junction 108. Junction 108 is connected to contact 106 of switch 103. A D.C. source of potential 117 is provided having a positive pole 118 and a negative pole 119. Negative pole 119 is connected to junction 107. Positve pole 118 is connected to contact 105.

Winding 102 has leads 120 and 121. Thermostat 101 has leads 122 and 123. Lead 120 of winding 102 is connected to junction 107. Thermostat lead 123 is connected to lead 121 of winding 102. Thermostat lead 122 is connected to pole 104 of switch 103.

Thermostat 101 has various junctions 11, 12, 18 and 19. Thermostat 101 also has first, second, third, fourth, fifth and sixth junctions 10, 13, 14, 15, 16 and 17, respectively.

A first resistor 20 is connected between junctions 13 and 14. A second resistor 21 is connected between junctions 13 and 16. A third resistor 22 is provided having a winding 23 with an open 24, the winding 23 otherwise being connected between terminals 25 and 26. Resistor 22 also has a wiper 27 connected from junction 19. Terminal 25 is also connected to junction 19. Terminal 26 is connected to junction 10.

In accordance with the foregoing, it will be appreciated that resistor 22 is a variable resistor. Moreover, it may be a conventional potentiometer except that an open is provided at 24 in winding 23.

A fourth resistor 28 is connected between junctions 10 and 15. Resistor 28 is temperature sensitive. For example, resistor 28 may be a thermistor. Resistors are further provided at 29 and 30. Resistors 29 and 30 may be described as "first and second auxiliary resistors," respectively. Alternatively, resistors 29 and 30 may be described as "fifth and sixth resistors." Resistor 29 is connected between junctions 14 and 17. Resistor 30 is connected between junctions 15 and 16.

A diode 31 is provided in thermostat 101 connected from junction 16 therein to thermostat lead 123. Diode 31 is poled to be conductive in a direction toward thermostat lead 123.

Junctions 10 and 11 are connected together. A capacitor 32 is connected between junctions 11 and 12. Capacitor 32 may be omitted, if desired. Junctions 12 and 13 are connected together. Junctions 17, 18 and 19 are all connected together.

Thermostat 101 also has a differential amplifier 33. Amplifier 33 has a non-inverting input lead 34, an inverting input lead 35, a first power input lead 36, a second power input lead 37 and an output lead 38.

First power input lead 36 of amplifier 33 is connected from junction 14. Second power input lead 37 is connected to junction 15. The non-inverting input lead 34 is connected from junction 12. The inverting input lead 35 is connected from junction 11. Junction 18 is connected to thermostat input lead 122.

A conventional light emitting diode D is connected from junction 18 to lead 38 and is poled in a direction toward lead 38. Diode D may be short circuited and omitted, if desired. Diode D, if it were connected in series with one of the leads 37, 122 or 123 rather than as shown in FIG. 1, would be illuminated during standby or "off" and would cause a significant voltage drop during the "on" state, the voltage drop causing the voltage across the gas valve 102 to be undesirably reduced. The use of diode D connected as shown in FIG. 1 has neither the said standby illumination disadvantage nor the said voltage dropping disadvantage.

As used herein, "on state" means the state during which the impedance between leads 37 and 38 is effectively zero. Conversely, as used herein, "off state" means the state during which the impedance between leads 37 and 38 is effectively infinite.

The open 24 in resistor winding 23 makes it possible to turn the thermostat 101 off. This is merely an advantageous feature in certain cases, and need not always be employed. For example, a resistor 22' in FIG. 2 has a winding 23' that has no open.

As is conventional, thermostat 101 may be located in a space which is heated in response to energization of valve winding 102. The temperature of the space is thus kept approximately constant although it may vary slightly as the valve winding 102 is energized and deenergized. At any rate, the temperature in the space will be kept approximately constant at a set point determined by the position of wiper 27 on winding 23 below the open 24 therein, as viewed in FIG. 1.

Capacitor 32 prevents the thermostat 101 from turning the valve winding 102 on and off at a rapid rate.

Resistor 29 provides feedback for a more stable snap. Resistor 29 also makes the gain of the amplifier approximately constant and independent of the magnitude of the voltage applied to the thermostat 101 between thermostat leads 122 and 123.

Resistor 30 provides positive feedback. This provision makes the opening of the circuit between thermostat leads 122 and 123 cleaner when the voltage between leads 122 and 123 is at a low state.

The diode 31 is exceptionally useful. It performs three functions. It provides rectification. It also prevents damage to the thermostat 101 if source 117 is connected between junction 107 and contact 105 with the wrong polarity. Still further, diode 31 is mounted in a fixed position relative to thermistor 28. Diode 31 is also mounted in a position contiguous to thermistor 28 so that heat can be transferred from diode 31 to thermistor 28. This arrangement provides heat anticipation.

The switch 103 in FIG. 1 is employed, for example, in a recreational vehicle to connect thermostat lead 122 either to a source 117 carried by the vehicle, or to an outside source of supply connected to transformer primary winding 110. Diodes 115 and 116 provide full wave rectification in this case. However, regardless of which contact 105 and 106 pole 104 engages, power is supplied to thermostat 101 over leads 122 and 123 through valve winding 102 from switch pole 104 and junction 107, respectively.

If the temperature in the space rises, the resistance of negative temperature coefficient thermistor 28 will fall. The potential of junction 10 will also fall. When the resistance of thermistor 28 falls below the set point, the resistance between amplifier output lead 38 and junction 15 may become substantially infinite. This will reduce the current in valve winding 102, and the valve connected therewith will close. Fuel will then no longer be supplied to the furnace. If the temperature in the space decreases, the resistance of thermistor 28 thus increases. The potential of junction 10 also increases. The resistance between amplifier output lead 38 and junction 15 will then be substantially low. In either case, note will be taken that junction 10 is connected to the inverting input lead 35 of amplifier 33. This explains the reasons for the behavior of the amplifier 33.

The amplifier 33 provides substantially a stable function. This is true because feedback is established by the use of both of the resistors 29 and 30. In other words, when the resistance of thermistor 28 falls below the set point resistance, the resistance between amplifier output lead 38 and junction 15 increases. The converse is also true.

A capacitor C is connected between leads 122 and 123 to permit operation in noise. Capacitor C may also be omitted, if desired.

As shown in FIG. 2, as before, resistor 22' has a wiper connected to a junction 19'. The apparatus shown in FIG. 2 may be connected to all the apparatus of thermostat 101 to the right of a line 39, shown in FIG. 1.

In FIG. 2, a thermistor is provided at 28'. All the structure shown in FIG. 2 to the left of switch 100 may be identical to that shown to the left of line 39 in FIG. 1. However, preferably, no opening is provided in winding 23' such as opening 24 in winding 23. The circuit of FIG. 2 includes a junction 10' which may be identical to junction 10 in FIG. 1 and may be connected to junction 11 in FIG. 1 in lieu of all the structures shown to the left of line 39 in FIG. 1.

In FIG. 2, output leads are shown at 40 and 41 which are to be connected to junctions 17 and 15, respectively.

Thermistor 28' has a lead 42 connected from junction 10', and a lead 43 which is connected to a pole 44 of switch 100. Winding 23' of resistor 22' is connected between junctions 10' and 19'. Junction 19' is connected to a pole 45 of switch 100.

Switch 100 also has contacts 46, 47, 48 and 49. Poles 44 and 45 may be ganged together, if desired. Pole 45 may be moved into engagement with contact 46 when pole 44 is moved into engagement with contact 48. When pole 45 is moved into engagement with contact 47, pole 44 is moved into engagement with contact 49.

A junction is provided at 50. Contact 46 is connected to junction 50. Contact 49 is also connected to junction 50. Another junction is provided at 51. Contacts 47 and 48 are both connected to junction 51. Junctions 50 and 51 are connected respectively to leads 40 and 41.

When the switch 100 is in the position shown in FIG. 2, the thermostat 101 will operate properly for heating. When the switch 100 is moved to its other position, the thermostat 101 will be connected properly for cooling.

Although the circuits of FIGS. 1 and 2 are shown for use with a source of potential of only one polarity, the use of a source of potential of the opposite polarity may be employed by making appropriate changes in the circuit. For example, one of these changes would be to employ PNP transistors for all NPN transistors and vice versa.

Another outstanding advantage of the thermostat 101 of the present invention is that it requires only the use of the two leads 122 and 123.

Source 117 may or may not supply a potential of, for example, 12 volts. The same is true of the potential between contact 106 and junction 107.

Still further, as an example only, source 117 may supply a potential of 12 volts when the potential supplied between contact 106 and junction 107 is 24 volts, or vice versa.

Another advantage of the present invention is that it does not require a filtered power supply.

The thermostat 101 draws only, for example, 0.5 milliamperes at 12 volts standby.

In another alternative embodiment of the invention, pole 118 of source 117, and junction 108 may both be connected to lead 122. That is, switch 103 may be eliminated so long as diodes 115 and 116 are employed. Conversely, diode 115 and 116 may be eliminated when switch 103 is employed. This is true because the diode 31 can provide proper rectification. However, one of the leads 113 or 114, in this case, must be disconnected to provide half wave rectification.

If switch 103 is omitted, the peak voltage appearing between contact 106 and junction 107 may be higher than the output voltage of source 117, if desired.

Amplifier 33 may be any conventional amplifier. However, if desired, Fairchild semiconductor amplifier $\mu$A741 may be employed.

The word "connected," as used herein and in the claims, is hereby defined to mean connected by any one or more of a series of electrical equipment including, but not limited to, a resistor and/or a conductor.

As will be noted in the following, circuit values are given. However, the present invention is by no means limited to these values.

| | |
|---|---|
| Capacitor 32 | 0.47 microfarad |
| Capacitor C | 0.02 microfarad |
| Fairchild semiconductor differential amplifier $\mu$A741 | |
| Potentiometer 22 | 50,000 ohms (between wiper 27 and terminal 26 when wiper 27 is in position shown in FIG. 1) |
| Potentiometer 22' | 100,000 ohms (from junction 10' to junction 19') |
| Resistor 20 | 47,000 ohms |
| Resistor 21 | 47,000 ohms |
| Resistor 29 | 100 ohms |
| Resistor 30 | 1.0 ohm |

-Continued

| | |
|---|---|
| Thermistor 28 | 50,000 ohms |
| Thermistor 28' | 50,000 ohms |

OPERATION

In the operation of the embodiment of FIG. 1, if the resistance of thermistor 28 falls below the set point resistance of resistor 22, the potential of junction 10 will drop. The resistance between junctions 18 and 15 will then approach the infinite because the potential of junction 18 must rise. This is true because of the inherent operation of a differential amplifier. That is, when the potential of junction 10 falls, so does the inverting input potential of amplifier 33 (junction 10 is connected to lead 35). When the inverting input potential of amplifier 33 falls, the potential of junction 18 must rise because it is connected to the output lead 38 of amplifier 33. (The output of a differential amplifier rises when the inverting input falls. This is by definition.)

When the resistance between junctions 18 and 15 is effectively infinite, all the current is effectively shut off through winding 102, and the system no longer heats. (There is still the 5 mil current through winding 102, but this is inadequate to open the gas valve. The gas valve remains tightly closed.)

Conversely, when the resistance of thermistor 28 rises above the set point resistance of resistor 22, the resistance between junctions 18 and 15 will be low, and winding 102 will receive its rated current. The gas valve will then open, and heat will be supplied until the furnace heat and that supplied by diode 31 to thermistor 28 is sufficient to lower the resistance of thermistor 28 toward, at or above the set point resistance. If the resistance of the thermistor 28, for example, rises above the set point resistance of resistor 22, the thermostat 101 will once again effectively shut off all current to winding 102 as described previously.

Note will be taken that the high impedance of the thermostat 101 between the leads 122 and 123 looking to the left as viewed in FIG. 1 is sufficiently high to prevent the gas valve from opening. Further, the low impedance of the thermostat 101 is sufficiently low to cause the gas valve to open.

The circuit 101 is not limited for use as a thermostat. For example, resistors 20, 21, 22 and 28 may be the legs of a conventional strain gage bridge, where one or both of the resistors 22 and 28 may be strain gages.

Thermostat 101 may be operated as a modulating thermostat by reversing leads 34 and 35. The same may also be accomplished by disconnecting the lower ends of the leads of resistors 21 and 28, as viewed in FIG. 1, from junctions 16 and 15, respectively, and connecting them back to junctions 15 and 16, respectively.

SUMMARY

Function

It is implicit in the phrase "Two Wire Thermostat" that the control acts as a switch having a low impedance circuit between the terminals when "on" and having a high impedance when "off." This thermostat meets the requirements for controlling a low power load with a simplified and improved method.

Load and Power Supply

The circuit of FIG. 1 utilizes a low power operated gas valve or relay having an operating current less than 15 milliamperes. The power supply for the circuit may be 12VDC, 12 VDC Full Wave Rectified, 24VAC or ½ Wave Rectified 24VAC. When operating on 24VAC, the thermostat operates on ½ wave only, the valve or relay being, in this case, capable of ½ wave operation, if required.

Thermostat Circuit

Standby "Off-State"

The circuit in the "off" state has a current draw in leads 122 and 123 of approximately 0.5 mA at 12 volts or equivalent to about 24,000 ohms.

"On State"

As a heating thermostat, the negative temperature coefficient thermistor 28 increases in resistance with a drop in temperature causing junction 11 to increase in potential with respect to junction 13. This causes the output of the amplifier 33 to approach the potential of lead 37. This condition lowers the potential between leads 122 and 123 through resistor 30 and diode 31 to approximately 4–5 volts when below the typical internal current limit of 20 mA.

Differential

The temperature differential from "on" to "off" is controlled by the load current passing through resistor 30 and the change in power supply current passing through resistor 29. The current through resistor 30 creates positive feedback into junction 13 to cause a snap "off" to occur. Resistor 29 causes a feedback to occur overcoming some of the differential effect of resistor 30.

The advantage of resistor 29 is to stabilize the overall gain of the amplifier having a variable power supply voltage across 36 and 37 by decreasing the feedback at low voltage across 122 and 123, thereby increasing the stability of the somewhat voltage sensitive amplifier 33. This gain stabilization is an important feature as the voltage varies from 4 to 12 volts between "on" and "off."

Resistor 29 provides effectively negative feedback in one instance because it tends to hold the steady state noninverting input of amplifier 33 at a more or less constant potential independent of changes in amplitude of the voltage impressed upon thermostat 101 between leads 122 and 123 thereof. In another instance, resistor 29 provides effectively positive feedback during snap.

A further improvement in the differential imparted by resistor 30 is that the differential increases as the load current increases with power supply voltages, at the same time the heat anticipation level from diode 31 increases in a similar proportion to maintain the cycling rate of the thermostat relatively constant. The compensation effect against power supply voltage permits the use of widely varying voltages as an A.C. signal imparts.

Transient Suppression

The capacitor C is used to prevent transients from exceeding the compensation effect of voltage as well as preventing damage due to excessive voltage to the amplifier 33. Capacitor 32 is used to retain the offset voltage caused by the differential during the zero voltage condition of the power supply in ½ wave and full wave rectified operation.

PERFORMANCE

The performance of this circuit is relatively constant for widely varying conditions and has a thermal differential of approximately 0.35° F. and 1° F. droop, with a resultant cycling rate of 10 cycles per hour.

What is claimed is:

1. A thermostat comprising: a first main lead; a second main lead; a first resistor; a second resistor; a third resistor; a fourth resistor; a first junction; a second junction; a third junction; a fourth junction; a fifth junction; a sixth junction, said third resistor being connected from one of said fourth and sixth junctions to said first junction, said fourth resistor being connected from the other of said fourth and sixth junctions to said first junction, said third and sixth junctions being connected together, said first main lead being connected to said sixth junction, said first resistor being connected from said third junction to said second junction, said second resistor being connected from said second junction to said fifth junction, said third resistor having an adjustable resistance, said fourth resistor having a resistance which changes with a predetermined variable, said fourth junction being connected to said fifth junction, said fifth junction being connected to said second main lead; and a differential amplifier having a first signal input lead, a second signal input lead, a first power input lead, a second power input lead, and an output lead, said first power input lead being connected to said third junction, said second power input lead being connected to said fourth junction, said first signal input lead being connected from said first junction, said second signal input lead being connected from said second junction, said output lead being connected to said first main input lead, said fourth resistor being a temperature sensitive resistor, a fifth resistor connected from said third junction to said sixth junction, and a sixth resistor connected from said fourth junction to said fifth junction.

2. The invention as defined in claim 1, wherein the first signal input lead of said differential amplifier is the inverting input lead thereof, the second signal input lead of said differential amplifier being the noninverting input lead thereof, a capacitor connected from said first junction to said second junction, said third resistor being connected from said sixth junction to said first junction, said fourth resistor being connected from said fourth junction to said first junction.

3. A thermostat comprising: a first main lead; a second main lead; a first resistor; a second resistor; a third resistor; a fourth resistor; a first junction; a second junction; a third junction; a fourth junction; a fifth junction; a sixth junction, said third resistor being connected from one of said fourth and sixth junctions to said first junction, said fourth resistor being connected from the other of said fourth and sixth junctions to said first junction, said third and sixth junctions being connected together, said first main lead being connected to said sixth junction, said first resistor being connected from said third junction to said second junction, said second resistor being connected from said second junction to said fifth junction, said third resistor having an adjustable resistance, said fourth resistor having a resistance which changes with a predetermined variable, said fourth junction being connected to said fifth junction, said fifth junction being connected to said second main lead; and a differential amplifier having a first signal input lead, a second signal input lead, a first power input lead, a second power input lead, and an output lead, said first power input lead being connected to said third junction, said second power input lead being connected to said fourth junction, said first signal input lead being connected from said first junction, said second signal input lead being connected from said second junction, said output lead being connected to said first main input lead, said fourth resistor being a temperature sensitive resistor, a fifth resistor connected from said fourth junction to said fifth junction, the first signal input lead of said differential amplifier is the inverting input lead thereof, the second signal input lead of said differential amplifier being the noninverting input lead thereof, a capacitor connected from said first junction to said second junction, said third resistor being connected from said sixth junction to said first junction, said fourth resistor being connected from said fourth junction to said first junction.

* * * * *